(12) United States Patent
Wang et al.

(10) Patent No.: US 8,833,979 B2
(45) Date of Patent: Sep. 16, 2014

(54) LIGHT SOURCE DEVICE WITH OUTER LENS AND LIGHT SOURCE SYSTEM USING THE SAME

(75) Inventors: Chun-Lin Wang, Taichung (TW); Yu-Shan Shen, Taichung (TW); Chung-Hsing Chang, Taichung (TW)

(73) Assignee: Briview Corporation, Lungtan, Taoyuan (TW)

( * ) Notice: Subject to any disclaimer, the term of this patent is extended or adjusted under 35 U.S.C. 154(b) by 0 days.

(21) Appl. No.: 13/604,701

(22) Filed: Sep. 6, 2012

(65) Prior Publication Data

US 2013/0229808 A1 Sep. 5, 2013

(30) Foreign Application Priority Data

Mar. 2, 2012 (TW) .............................. 101106996 A

(51) Int. Cl.
*F21V 3/00* (2006.01)
*F21V 5/00* (2006.01)
(52) U.S. Cl.
USPC ................. 362/311.01; 362/311.02; 362/326; 362/561
(58) Field of Classification Search
CPC ................................... F21S 2/00; F21V 19/00
USPC ........................ 362/311.01, 311.02, 326, 561
See application file for complete search history.

(56) References Cited

U.S. PATENT DOCUMENTS

| 4,703,405 | A | * | 10/1987 | Lewin | 362/333 |
|---|---|---|---|---|---|
| 5,757,557 | A | * | 5/1998 | Medvedev et al. | 359/708 |
| 6,724,543 | B1 | * | 4/2004 | Chinniah et al. | 359/718 |
| 6,819,506 | B1 | * | 11/2004 | Taylor et al. | 359/726 |
| 7,348,723 | B2 | | 3/2008 | Yamaguchi et al. | |
| 7,352,011 | B2 | * | 4/2008 | Smits et al. | 257/99 |
| 7,422,347 | B2 | * | 9/2008 | Miyairi et al. | 362/335 |
| 7,431,492 | B2 | | 10/2008 | Ohkawa | |
| 7,445,370 | B2 | | 11/2008 | Ohkawa | |
| 7,506,999 | B2 | * | 3/2009 | Uchida et al. | 362/245 |
| 7,607,799 | B2 | | 10/2009 | Ohkawa | |
| 7,621,657 | B2 | | 11/2009 | Ohkawa | |

(Continued)

FOREIGN PATENT DOCUMENTS

CN 102252267 A 11/2011

OTHER PUBLICATIONS

English translation of specification and claims of CN 102252267 A (published Nov. 23, 2011).
China Office Action dated Jul. 23, 2014.

*Primary Examiner* — Thomas A Hollweg
(74) *Attorney, Agent, or Firm* — McClure, Qualey & Rodack, LLP

(57) ABSTRACT

A light source device and a light source system using the same are provided. The light source device includes a lens and a light source disposed under the lens. The lens has a light-emitting top surface and a bottom surface having a hole that is surrounded by an inner wall surface and an inner top surface. The inner top surface and a projection area of thereof onto the light-emitting top surface are flat surfaces. The light source has an illumination area, wherein an opening of the hole covers a projection area of the illumination area onto the bottom surface. The light source system includes a plurality of the light source device disposed in a honeycomb arrangement, wherein the light source devices are spaced apart from each other.

19 Claims, 10 Drawing Sheets

(56) References Cited

U.S. PATENT DOCUMENTS

| | | |
|---|---|---|
| 7,645,054 B2 * | 1/2010 | Goihl .......................... 362/244 |
| 7,798,679 B2 | 9/2010 | Kokubo et al. |
| 7,819,560 B2 | 10/2010 | Ohkawa |
| 7,866,844 B2 | 1/2011 | Yamaguchi |
| 7,972,029 B2 * | 7/2011 | Pruss et al. .................... 362/245 |
| 8,167,462 B2 * | 5/2012 | Kim et al. ................ 362/311.02 |
| 8,177,378 B2 * | 5/2012 | Ohkawa ...................... 362/97.1 |
| 8,220,975 B2 * | 7/2012 | Miyashita et al. ............ 362/340 |
| 2004/0246744 A1 * | 12/2004 | Krupa et al. ................... 362/574 |
| 2005/0024744 A1 * | 2/2005 | Falicoff et al. ................ 359/737 |
| 2006/0044806 A1 * | 3/2006 | Abramov et al. ............ 362/337 |
| 2006/0083000 A1 | 4/2006 | Yoon et al. |
| 2006/0209558 A1 * | 9/2006 | Chinniah et al. .............. 362/545 |
| 2008/0013322 A1 * | 1/2008 | Ohkawa ........................ 362/311 |
| 2008/0068852 A1 * | 3/2008 | Goihl ............................ 362/509 |
| 2008/0100773 A1 * | 5/2008 | Hwang et al. ................... 349/62 |
| 2008/0137331 A1 * | 6/2008 | Kaneko et al. ................ 362/231 |
| 2009/0207586 A1 * | 8/2009 | Arai et al. .................... 362/97.1 |
| 2009/0279311 A1 * | 11/2009 | Yu et al. ....................... 362/310 |
| 2009/0296405 A1 * | 12/2009 | Tetsuo .......................... 362/308 |
| 2010/0259706 A1 * | 10/2010 | Kuwaharada et al. .......... 349/62 |
| 2010/0271708 A1 * | 10/2010 | Wilcox ......................... 359/654 |
| 2010/0284194 A1 * | 11/2010 | Miyashita et al. ....... 362/311.09 |
| 2011/0063840 A1 * | 3/2011 | Anderson et al. ............. 362/237 |
| 2011/0116272 A1 * | 5/2011 | Bak et al. .................. 362/296.01 |
| 2011/0122632 A1 * | 5/2011 | Ku et al. ................... 362/311.02 |
| 2011/0279751 A1 * | 11/2011 | Iiyama et al. ................... 349/64 |
| 2012/0044700 A1 * | 2/2012 | Chen et al. ................ 362/311.02 |

* cited by examiner

LIGHT SOURCE DEVICE WITH OUTER LENS AND LIGHT SOURCE SYSTEM USING THE SAME

BACKGROUND OF THE INVENTION

1. Field of the Invention

The present invention generally relates to a light source device and a light source system formed thereof; particularly, the present invention relates to a light source device and a light source system formed thereof that has an external lens.

2. Description of the Related Art

Within various technical fields, especially to the field of display technology and illumination equipments, the design of light sources has always been an important aspect of light sources. Conventional light sources typically utilize light bulbs or incandescent tubes as light sources. As the technology of light-emitting diodes (LED) has matured and since LEDs have advantages of being small and being environmentally friendly by saving energy, LEDs have gradually become a mainstay on the market.

In order to increase the illumination area in practical usage, the conventional light source as shown in FIG. 1 has a lens 10 disposed and covering on top of a light-emitting diode chip 30. As shown in FIG. 1, an empty cavity 11 is formed within the lens 10 to accommodate the light-emitting diode chip 30. The top of the lens 10 forms a recess 13 that is directly above the light-emitting diode chip 30. In this design, the angle at which light is emitted is determined by an outer surface 15 of the lens 10 so that a relatively larger light-emitting area may be obtained.

However, the distribution of light produced by the above design will typically form ring shaped areas of strong light. In other words, the light will not be smooth. In addition, since the light-emitting diode chip 30 is completely covered within the cavity 11, there will be heat dissipation problems.

SUMMARY OF THE INVENTION

It is an object of the present invention to provide a light source device and a light source system thereof that emits light with higher smoothness.

It is another object of the present invention to provide a light source device and a light source system thereof that has favorable heat dissipation properties.

The light source device includes a lens and a light source. The lens has a light-emitting top surface and a bottom surface, wherein the light-emitting top surface and the bottom surface are connected by an outer wall surface. The bottom surface concaves to form a hole, wherein the hole is formed from the surrounding of an inner wall surface and an inner top surface with an opening above the bottom surface. The inner top surface and a projection area of the inner top surface onto the light-emitting top surface are flat surfaces.

The light source is disposed below the opening of the hole and has an illumination area directed towards the hole. The opening of the hole covers a projection area of the illumination area onto the bottom surface such that the light emitting from the illumination area may be completely or substantially emitted into the hole through the opening. Through this design, light emitted from the inner top surface may pass through the inner top surface and be emitted out to the projection area corresponding to the light-emitting top surface. This improves light smoothness by decreasing the chances of total reflection. The center is prevented from generating dark spots as well as rings of strong light forming outside the dark spot.

The present invention also simultaneously provides a light source system including a plurality of the light source device. The plurality of light source devices is arranged in a honeycomb structure, wherein each light source device is spaced apart from one another. From another perspective, three adjacent light source devices will surround a hexagonal area that does not have the light source device disposed there. Every light source device will be surrounded by six of these hexagonal areas.

DETAILED DESCRIPTION OF THE PREFERRED EMBODIMENT

The present invention provides a light source device. In a preferred embodiment, the light source device is a light-emitting diode (LED) light source device. However, in other different embodiments, the light source device may also utilize other light sources that have an illumination area. In addition, the present invention provides a light source system that includes a plurality of the light source devices. Through adjusting the arrangement and direction of the light source devices, better light effects may be produced.

Figure 1:
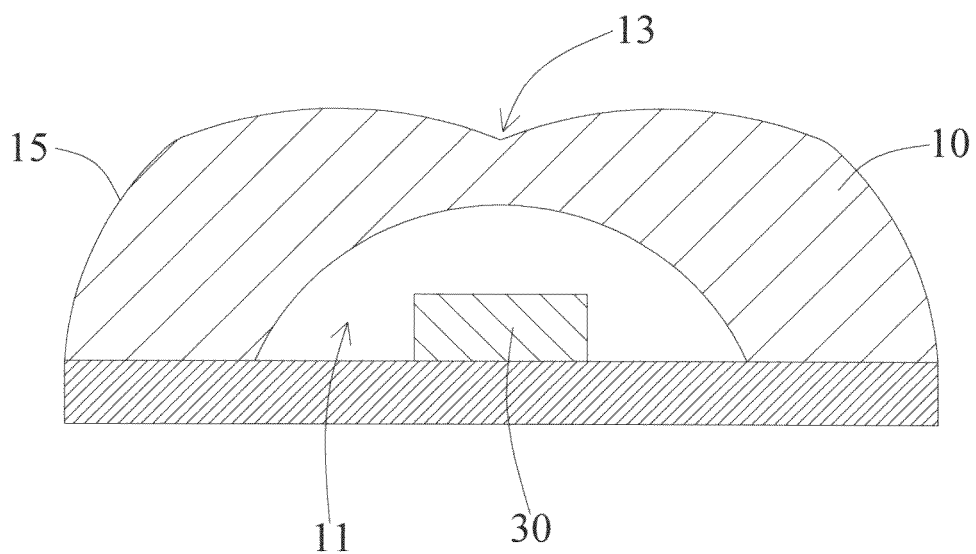
FIG. 1 is a view of the conventional light source device.
Figure 2:
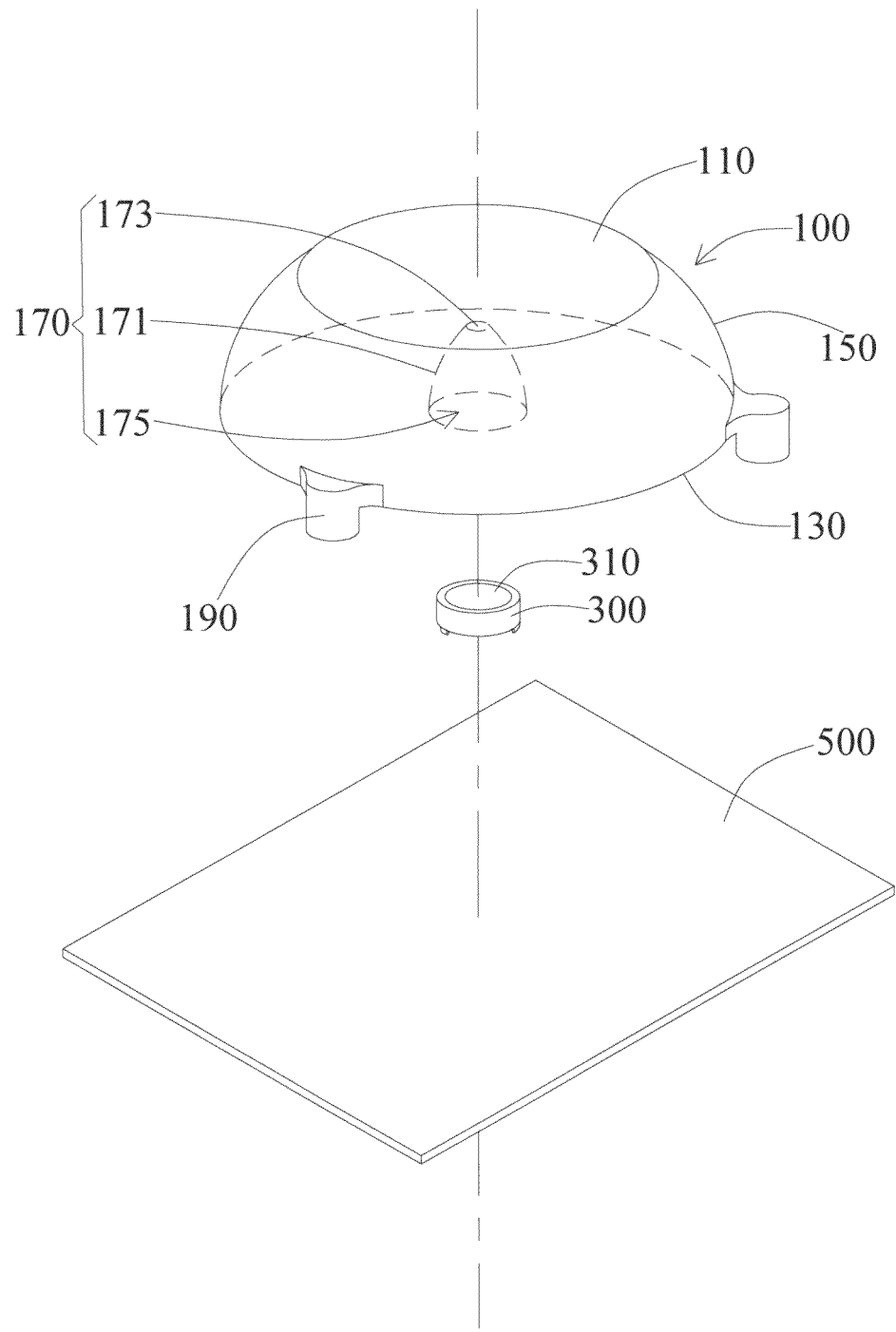
FIG. 2 is an exploded view of an embodiment of the light source device of the present invention.

As shown in FIGS. 2 and 3, the light source device includes a lens 100 and a light source 300. The lens 100 has a light-emitting top surface 110, a bottom surface 130 opposite to the light-emitting top surface 110, and an outer wall surface 150 extending and connecting from the bottom surface 130 to the light-emitting top surface 110. In the present embodiment, the light-emitting top surface 110 and the bottom surface 130 are in the shape of a circle. However, in other different embodiments, the light-emitting top surface 110 and the bottom surface 130 may also be in the shape of a hexagon or any other polygon. The light-emitting top surface 110 may also be a circular shape while the bottom surface 130 is of a hexagonal shape (or vice-versa). The light-emitting top surface 110 is preferably smaller than the bottom surface 130, wherein the outer wall surface 150 preferably forms a convex curvature to make the entire structure of the lens 100 to be essentially a convex structure. The lens 100 preferably is formed of a transparent material, such as transparent plastic or glass. However, in other different embodiments, the lens 100 may also be formed from materials with light transmittance properties, wherein there may be an inclusion of different types of particles.

Figure 3A:
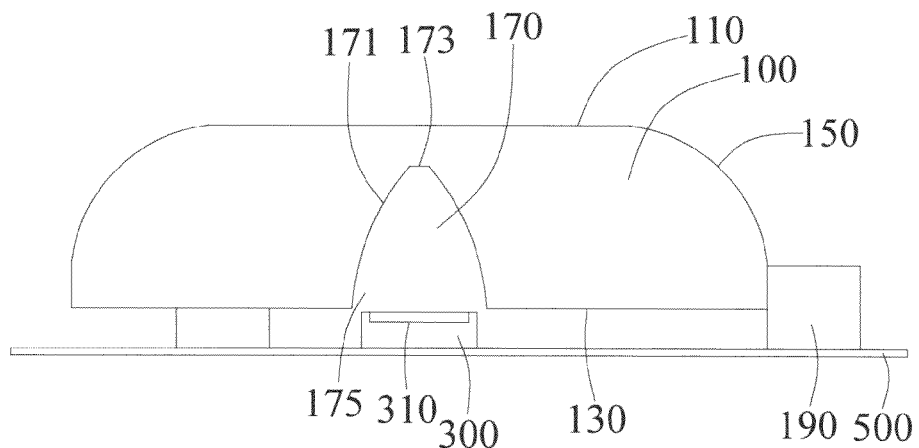
FIG. 3A is a cross-sectional view of an embodiment of the light source device.
Figure 3B:
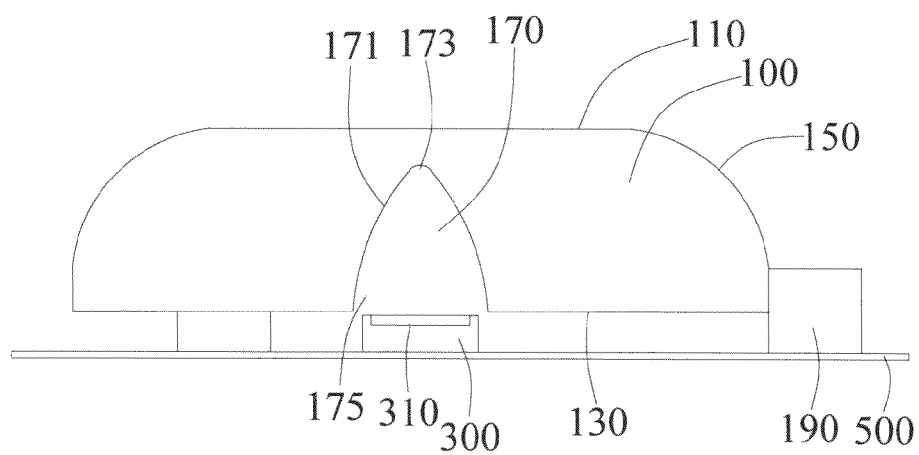
FIG. 3B is a cross-sectional view of an embodiment of the light source device.

As shown in FIG. 3A, a hole 170 recessed towards the light-emitting top surface 110 is formed above the bottom surface 130, wherein the hole 170 is preferably bullet shaped. The hole 170 is formed from the surrounding of an inner wall surface 171 and an inner top surface 173. The inner top surface 173 is connected to the top of the inner wall surface 171. In other words, the inner top surface 173 is connected to the inner wall surface 171 at the hole 170 to the portion that is relatively closer to the light-emitting top surface 110. An opening 175 is formed from the hole 170 being surrounded by the inner wall surface 171 on the bottom surface 130. The inner top surface 173 and the opening 175 are preferably circular shapes. However, in other different embodiments, the inner top surface 173 and the opening 175 may also be hexagonal shaped or may be of other shapes. As shown in FIG. 3A, the inner top surface 173 and a projection area corresponding to light emitted on the light-emitting top surface 110 from the inner top surface 173, or a projection area of the inner top surface 173 on the light-emitting top surface 110, are preferably flat surfaces. In other words, the inner top surface 173 and the projection area corresponding to light from the inner top surface 173 onto the light-emitting top surface 110, or the projection area of the inner top surface 173 on the light-emitting top surface 110, are coplanar surfaces. However, in other different embodiments, the inner top surface 173 may utilize a design of a surface recessing towards the light-emitting top surface 110, as shown in FIG. 3B.

As shown in FIGS. 2 and 3A, the light source 300 is disposed below the bottom surface 130 of the lens 100 and corresponds to the hole 170. In a preferred embodiment, the light source 300 is disposed below the opening 175 of the hole 170. The light source 300 is preferably a light-emitting diode (LED). However, in other different embodiments, the light source 300 may also be of other types of directional or partially directional light-emitting devices. The light source 300 has an illumination area 310 directed towards the hole 170. The opening 175 of the hole 170 covers the projection area of the light emitted from the illumination area 310 onto the bottom surface 130. Through this design, light emitted out from the illumination area 310 may be completely emitted or substantially be emitted into the hole 170 through the opening 175.

In addition, in the present embodiment, the light source device further includes a substrate 500. The light source 300 is disposed on the substrate 500, wherein the lens 100 is also supported by the substrate 500. In other words, the lens 100 is not directly connected on to the light source 300. In a preferred embodiment, the substrate 500 is a flexible or hard circuit board. Preferably, there is a space between the illumination area 310 of the light source 300 and the bottom surface 130 of the lens 100, wherein this space may help dissipate heat and provide an air layer as an interface layer for transmission of light. However, in other different embodiments, the lens 100 may also be connected directly to an outer side or any other portion of the light source 300 such that the opening 175 of the hole 170 corresponds to the light area 310 of the light source 300. In the present embodiment, the lens 100 includes a plurality of supports 190 disposed on an outer side of the bottom surface 130, connecting to the outer wall surface 150. The supports 190 are disposed on the substrate 500 and connect to the substrate 500 such that there is sufficient space between the bottom surface 130 and the substrate 500 to accommodate the light source 300.

Figure 4:
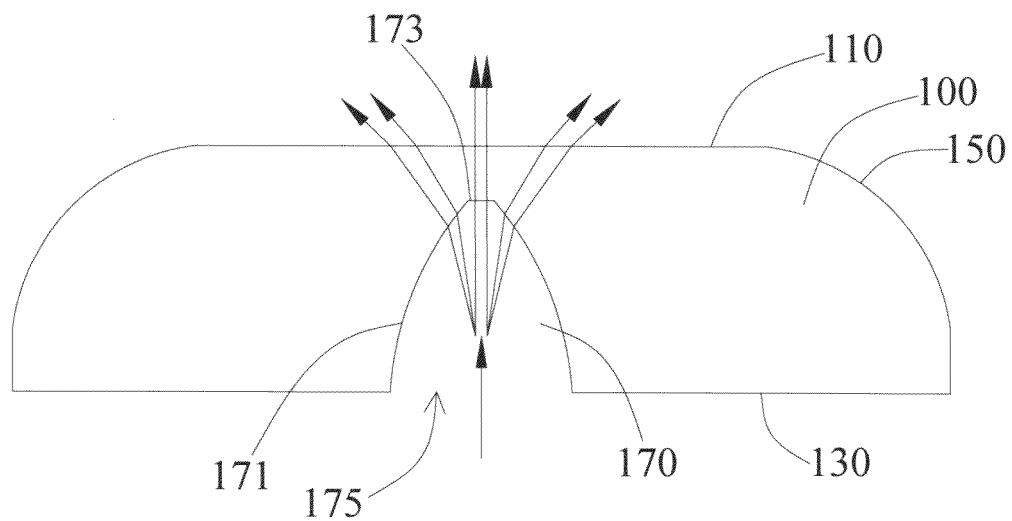
FIG. 4 is a cross-sectional view of the path of light of the light source device.

As shown in FIG. 4, light generated by the light source 300 and emitted out from the illumination area 310 is emitted into the hole 170 through the opening 175. The light then enters the lens 100 through the inner wall surface 171 and the inner top surface 173. As mentioned above, the projection area corresponding to the light that is emitted out from the inner top surface 173 onto the light-emitting top surface 110 is a flat surface and not a recessed surface. This surface is parallel with the inner top surface 173. In addition, the direction of a majority of the light emitting into the lens 100 from the inner top surface 173 is substantially perpendicular to the inner top surface 173 (angle of entrance is substantially 0 degrees). Therefore, light emitting from the inner top surface 173 is able to successfully pass through the inner top surface 173 onto the corresponding projection area of the light-emitting top surface 110 and then leave the light-emitting top surface 110. This decreases the chances of total reflection such that a dark spot is prevented from being produced in the center, while also decreasing rings of strong light from forming outside of the dark spot, which effectively increases the light smoothness.

Figure 5A:
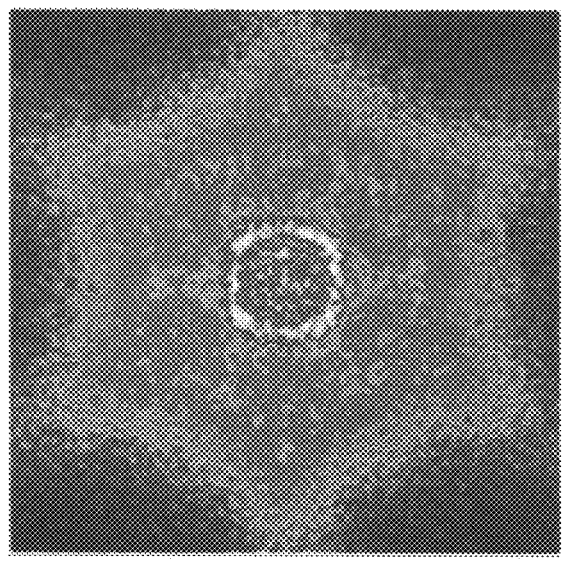
FIG. 5A is an embodiment of the distribution of light intensity of the light source device.
Figure 5B:
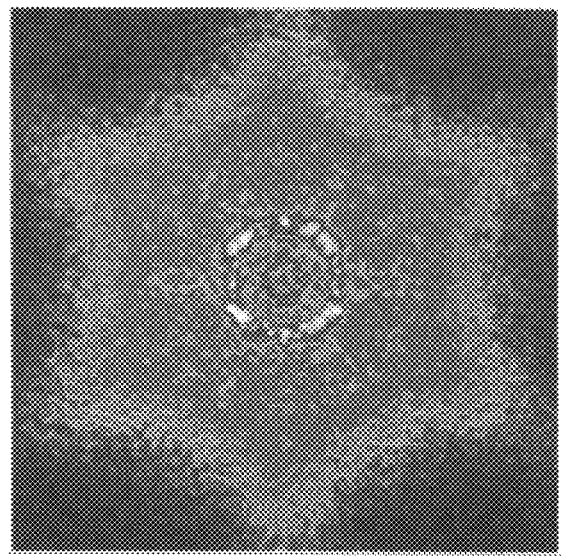
FIG. 5B is an embodiment of the distribution of light intensity when the light-emitting top surface or the inner top surface uses a recessed surface design.

FIGS. 5A and 5B are diagrams of distribution of light intensities based on different designs, wherein each color represents different levels of light intensity. The light intensities are categorized from strongest to weakest as follows: white, violet, blue, green, yellow, and then red. FIG. 5A is the light intensity distribution of the light source device when the inner top surface 173 and the corresponding projection area on the light-emitting top surface 110 by light emitting out from the inner top surface 173 are all flat surfaces. Whereas, FIG. 5B is the light intensity distribution of the light source device when the inner top surface 173 and the corresponding projection area on the light-emitting top surface 110 by light emitting out from the inner top surface 173 are of recessed surfaces. It can be clearly seen in FIG. 5A that the light intensities of the center portions is stronger than FIG. 5B, while a ring of particularly strong light may also be prevented.

In the embodiments of FIGS. 3A and 4, the outer wall surface 150 and the inner wall surface 171 both approach the center as they approach the light-emitting top surface 110. In other words, the closer the outer wall surface 150 and the inner wall surface 171 are to the light-emitting top surface 110, the closer their positions will be to the center of the lens 100. In addition, the outer wall surface 150 is a convex curvature and the inner wall surface 171 is a circular arc-shaped surface towards the outer wall surface 150. Through this design, the chances of light emitting out from the outer wall surface 150, after entering the lens 100 by way of the inner wall surface 171 and being refracted by the lens 100, may be decreased. In addition, microstructures may be disposed on the outer wall surface 150 and the inner wall surface 171 in accordance to specification requirements so that the path of light may be adjusted.

In a preferred embodiment, the curvature of the outer wall surface 150 and the inner wall surface 171 increases towards the light-emitting top surface 110. In other words, the closer to the light-emitting top surface 110, the greater the curvature. The average increase in curvature of the outer wall surface 150 towards the light-emitting top surface 110 is preferably greater than the average increase in curvature of the inner wall surface 171 towards the light-emitting top surface 110. In addition, the average curvature of the outer wall surface 150 is greater than the average curvature of the inner wall surface 171 so that the scope of the illumination area may be increased. In a preferred embodiment, the cross-sectional curvatures of the outer wall surface 150 and the inner wall surface 171 are Bezier curves using different parameters. However, in other different embodiments, the cross-sectional curvatures of the outer wall surface 150 and the inner wall surface 171 may be designed according to other different curve designs.

Figure 6:
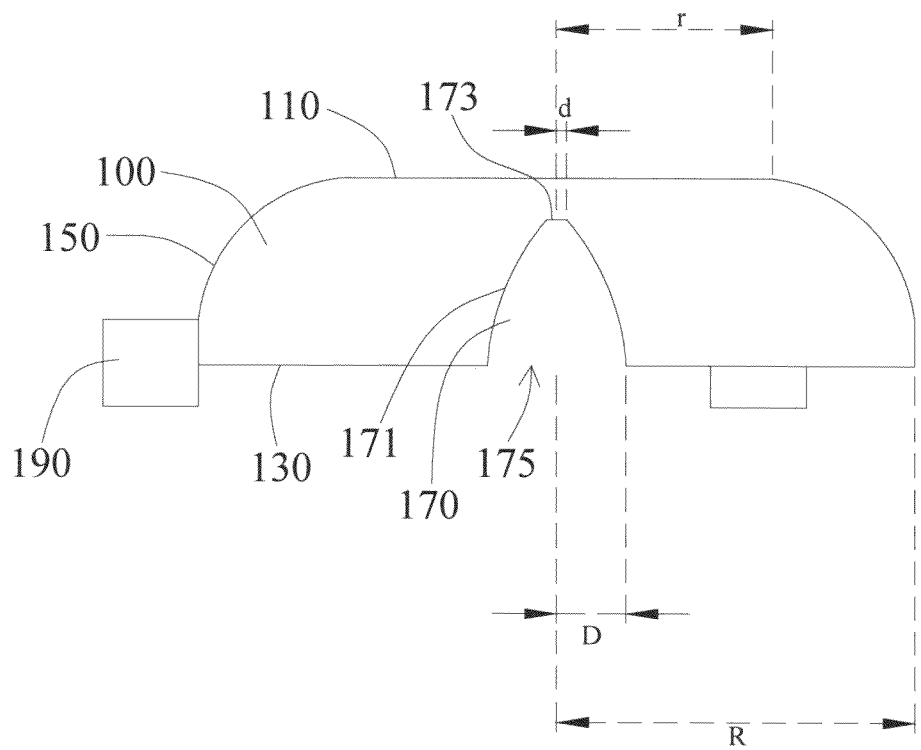
FIG. 6 is a cross-sectional view of an embodiment of the light source device.

As shown in FIG. 6, the ratio of a maximum radius r of the light-emitting top surface 110 and a maximum radius R of the bottom surface 130 (ie. r/R) is between 0.5 and 0.7. In a preferred embodiment, the light-emitting top surface 110 is a flat surface. However, in other different embodiments, the light-emitting top surface 110 may also be a curved surface or have microstructures. In addition, when the light-emitting top surface 110 and the bottom surface 130 are circular shapes, the maximum radius will be the radius of the circular shapes. However, when the light-emitting top surface 110 or the bottom surface 130 are hexagonal or any other polygonal shapes, the maximum radius will be half of the longest corner to corner length. On the other hand, the ratio of a radius D of the opening 175 of the hole 170 and the maximum radius of the light-emitting top surface 110 (ie. D/r) is between 0.2 and 0.4. The ratio of a radius d of the inner top surface 173 and the radius D of the opening 175 of the hole 170 above the bottom surface 130 is between 0.05 and 0.25. The opening 175 and the inner top surface 173 are preferably circular shapes. However, when the opening 175 or the inner top surface 173 are hexagonal or any other polygonal shapes, the maximum radius is half the distance of the longest corner to corner length. In addition, when the light-emitting top surface 110 and the bottom surface 130 are circular shapes, the above mentioned ratio of d/D is preferably between 0.05 and 0.2. Through the above mentioned design, light smoothness of the light source device may be increased while decreasing the occurrence of rings of strong light from forming.

Figure 7A:
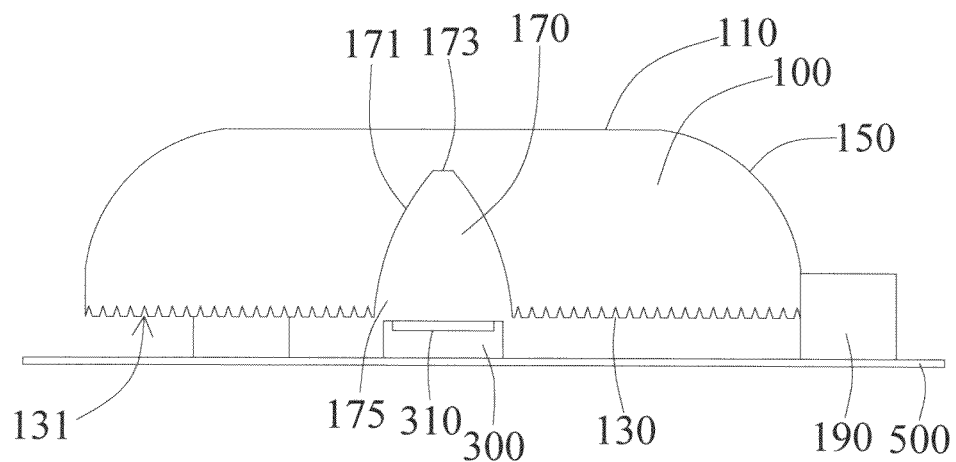
FIG. 7A is a view of an embodiment of the light source device having microstructures on the bottom surface.
Figure 7B:
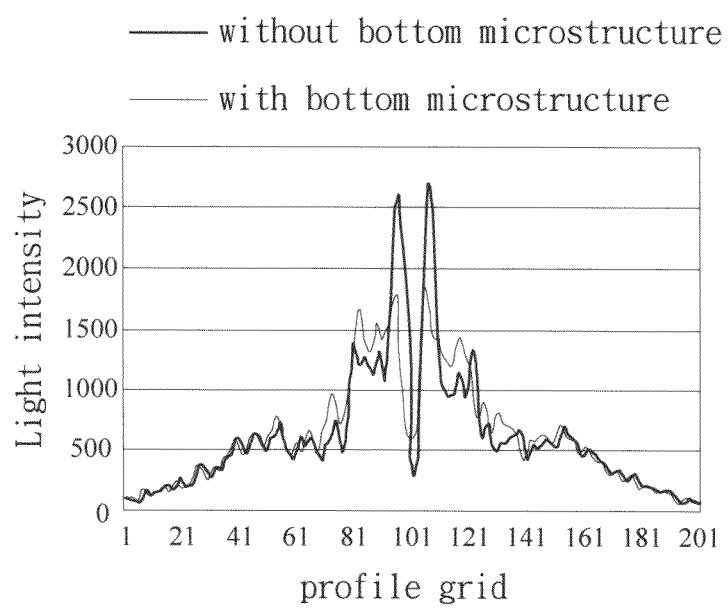
FIG. 7B is a comparison diagram of light intensity to the cross-section of the light source device.
Figure 7C:
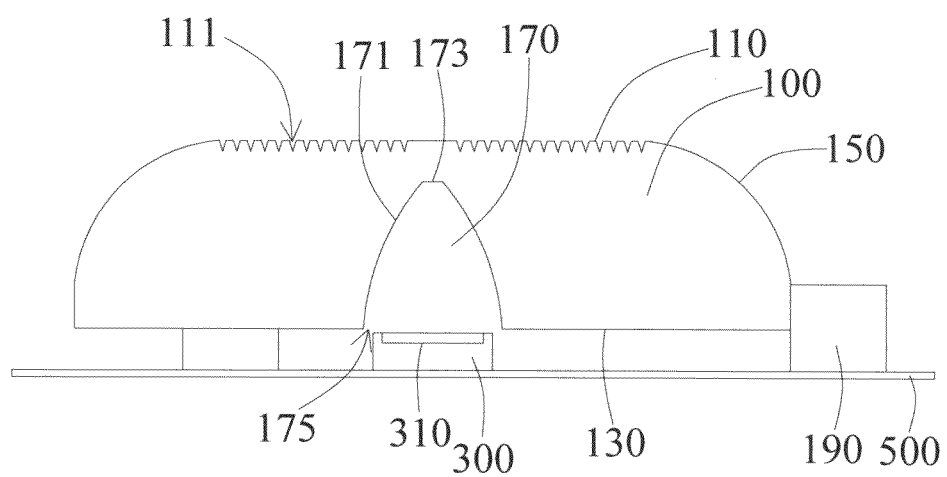
FIG. 7C is a view of an embodiment of the light source device having microstructures on the top surface.

In the embodiment shown in FIG. 7A, a plurality of bottom microstructures 131 are disposed on the bottom surface 130. In the present preferred embodiment, the bottom microstructures 131 are pyramid shaped recesses. However, in other different embodiments, the bottom microstructures 131 may also be other recesses or protrusions of different shapes. As shown in the distribution of light intensities of FIG. 7B, in comparison to the light source device without the bottom microstructures 131, light smoothness is increased from the decrease in light intensities at different positions after the bottom microstructures 131 have been implemented on the bottom surface 130. In addition, as shown in FIG. 7C, a plurality of top microstructures 111 may be disposed on the light-emitting top surface 110, wherein the top microstructures 111 may also be of different shapes of recesses or protrusions. The top microstructures 111 are preferably disposed corresponding area on the light-emitting top surface 110 where light emitted out of the inner top surface 173 reaches. Otherwise, at the very least, the top microstructures 111 are disposed outside of the projection area of light corresponding to the inner top surface 173 on the light-emitting top surface 110 such that the chances of dark spots forming near the center of the light source device are decreased.

Figure 8:
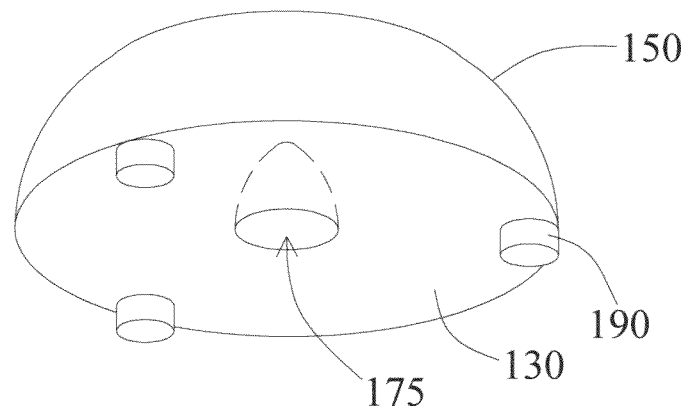
FIG. 8 is another embodiment of the lens of the light source device.

FIG. 8 illustrates another embodiment of the lens 100 of the light source device. In the present embodiment, the supports 190 of the lens 100 are at least partially disposed below the bottom surface 130. In other words, the supports 190 do not protrude or only partially protrude out of the boundaries of the bottom surface 130. The supports 190 protrude away from the bottom surface 130. Similar to the previous embodiment, the light source 300 is disposed being surrounded by the supports 190. Through this design, the affects of the supports 190 on the distribution of light intensity may be lessened.

Figure 9:
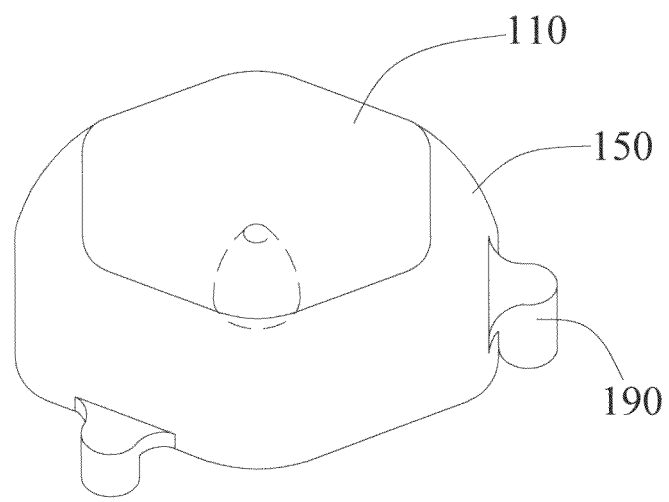
FIG. 9 is another embodiment of the lens of the light source device.

In an embodiment shown in FIG. 9, the light-emitting top surface 110 of the lens 100 and the bottom surface 130 are hexagonal shapes with the outer wall surface 150 curved accordingly to the sides of the hexagonal shape. In the present embodiment, the lens 100 has three supports 190, each separately disposed at the midpoint of non-adjacent sides of the hexagonal shape. In other words, each two adjacent sides of the hexagonal shape will only have one side that has a support 190. In this manner, the effects that the supports 190 have on the light smoothness may be decreased. However, in other different embodiments, the quantity and positions of the supports 190 may be changed according to design requirements.

Figure 10:
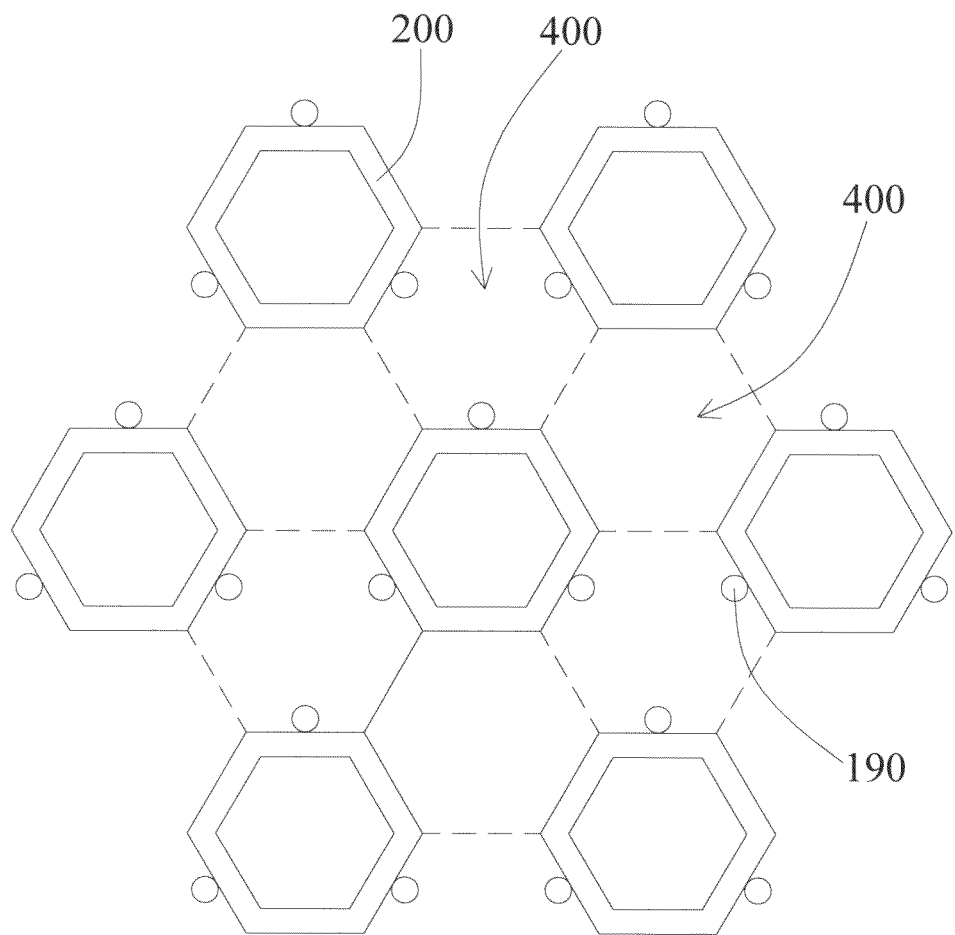
FIG. 10 is an embodiment of the light source system of the present invention.

The present invention also provides a light source system that preferably includes a plurality of the light source devices 200 of FIG. 9. As shown in FIG. 10, the plurality of light source devices 200 are arranged in a honeycomb structure, wherein there are spaces between each of the light source devices 200. In other words, in the honeycomb arrangement, the light source device 200 are disposed in a checker-like fashion, wherein the six sides of each light source device 200 are not connected to any adjacent light source devices 200. From another perspective, three adjacent light source devices 200 surround one hexagonal area 400 where no light source device 200 is disposed. Additionally, each light source device 200 is surrounded by six of these hexagonal areas 400.

In the present preferred embodiment, since each light source device 200 has three supports 190 that are disposed on alternating sides of the light source device 200, the hexagonal area 400 may be surrounded by the sides of light source devices 200 that have the supports 190. The hexagonal area 400 may also be surrounded by the sides of the light source devices 200 that do not have the supports 190. As shown in FIG. 10, in terms of one hexagonal area 400, the hexagonal area 400 is preferably surrounded by the sides having a support 190 of three adjacent light source devices 200. Conversely at the same time, there will also be hexagonal areas 400 that are surrounded by the sides without the supports 190 of three adjacent light source devices 200. In other words, when one side of the hexagonal area 400 corresponds to a side of the light source device 200 with the support 190, the other two sides separately corresponding to the other two adjacent light source devices 200 surrounding the hexagonal area 400 also have supports 190. Conversely, when one side of the hexagonal area 400 corresponds to a side of the light source device 200 without the support 190, the other two sides separately corresponding to the other two adjacent light source devices 200 surrounding the hexagonal area 400 are also preferably do not have the supports 190. Through this arrangement, the light smoothness of the entire light source system may be increased.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:
1. A light source device, comprising:
a lens having a light-emitting top surface and a bottom surface opposite to the light-emitting top surface, wherein the lens has a hole that is concave and formed from the surrounding of an inner wall surface and an inner top surface, the hole has an opening where the opening is in the bottom surface, and the inner top sur- face and a projection area of the inner top surface onto the light-emitting top surface are flat surfaces; and a light source disposed below the opening and corresponding to the hole, wherein the light source has an illumination area and the opening of the hole covers a projection area of the illumination area onto the bottom surface.

2. The light source device of claim 1, wherein the lens includes an outer wall surface extending from the bottom surface to the light-emitting top surface and surrounding the hole, the shorter the distance of a position of the outer wall surface and the inner wall surface to the light-emitting top surface is, the closer the distance of the position is to a center axis of the lens.

3. The light source device of claim 2, wherein the outer wall surface and the inner wall surface are curved surfaces, the curvature of the outer wall surface and the inner wall surface increases towards the light-emitting top surface.

4. The light source device of claim 3, wherein towards the light-emitting top surface, a rate of increase in curvature of the outer wall surface is greater than a rate of increase in curvature of the inner wall surface.

5. The light source device of claim 3, wherein an average curvature rate of the outer wall surface is larger than an average curvature rate of the inner wall surface.

6. The light source device of claim 2, wherein the lens includes a plurality of supports, the supports are positioned outside of the bottom surface and connect to the outer wall surface, and the light source is disposed within the area surrounded by the supports.

7. The light source device of claim 6, wherein the light-emitting top surface and the bottom surface are shaped as hexagons, the supports are positioned corresponding to the midpoints of the sides of the hexagon.

8. A light source system, comprising a plurality of the light source device of claim 7, wherein the light source devices are in a honeycomb arrangement such that the light source devices are disposed spaced apart from each other and forming a hexagonal area between three adjacent light source devices.

9. The light source system of claim 8, wherein each of the light source devices has three of the supports separately disposed on non-adjacent sides of the bottom surface that is in the shape of the hexagon; the hexagonal area is surrounded by the sides of three adjacent light source devices having the supports; or the hexagonal area is surrounded by the sides of three adjacent light source devices not having the supports.

10. The light source device of claim 2, wherein the lens includes a plurality of supports, the supports are at least partially under the bottom surface, and the light source is disposed within the area surrounded by the supports.

11. The light source device of claim 10, wherein the light-emitting top surface and the bottom surface are shaped as hexagons, the supports are positioned corresponding to the midpoints of the sides of the hexagon.

12. The light source device of claim 1, wherein a ratio of a biggest radius of the light-emitting top surface and a radius of the bottom surface is between 0.5 and 0.7.

13. The light source device of claim 1, wherein a ratio of a radius of the hole at the bottom surface and a biggest radius of the light-emitting top surface is between 0.2 and 0.4.

14. The light source device of claim 1, wherein a ratio of a radius of the inner top surface and a radius of the hole at the bottom surface is between 0.05 and 0.25.

15. The light source device of claim 14, wherein the ratio is between 0.05 and 0.2 when the light-emitting top surface and the bottom surface are circular shaped.

16. The light source device of claim 1, wherein the bottom surface has a plurality of bottom surface microstructures.

17. The light source device of claim 16, wherein the bottom surface microstructure is a pyramid shaped recess.

18. The light source device of claim 1, wherein the light-emitting top surface forms a plurality of top surface microstructure.

19. The light source device of claim 18, wherein a position of the top surface is outside of the projection area of the inner top surface onto the light-emitting top surface.

* * * * *